United States Patent
Kalhan et al.

(10) Patent No.: US 11,356,951 B2
(45) Date of Patent: Jun. 7, 2022

(54) INCREASING MTC DEVICE POWER-CONSUMPTION EFFICIENCY BY USING COMMON WAKE-UP SIGNAL

(71) Applicant: Kyocera Corporation, Kyoto (JP)

(72) Inventors: Amit Kalhan, San Diego, CA (US); Henry Chang, San Diego, CA (US)

(73) Assignee: Kyocera Corporation, Kyoto (JP)

( * ) Notice: Subject to any disclaimer, the term of this patent is extended or adjusted under 35 U.S.C. 154(b) by 72 days.

(21) Appl. No.: 16/771,459

(22) PCT Filed: Dec. 3, 2018

(86) PCT No.: PCT/US2018/063614
§ 371 (c)(1),
(2) Date: Jun. 10, 2020

(87) PCT Pub. No.: WO2019/125748
PCT Pub. Date: Jun. 27, 2019

(65) Prior Publication Data
US 2021/0185613 A1  Jun. 17, 2021

Related U.S. Application Data

(60) Provisional application No. 62/757,900, filed on Nov. 9, 2018, provisional application No. 62/607,196, filed on Dec. 18, 2017.

(51) Int. Cl.
*H04W 52/02* (2009.01)
*H04W 76/11* (2018.01)
(Continued)

(52) U.S. Cl.
CPC ..... *H04W 52/0235* (2013.01); *H04L 27/2607* (2013.01); *H04W 68/005* (2013.01); *H04W 76/11* (2018.02)

(58) Field of Classification Search
None
See application file for complete search history.

(56) References Cited

U.S. PATENT DOCUMENTS

| | | | |
|---|---|---|---|
| 2004/0081079 A1* | 4/2004 | Forest | H03M 13/43 370/216 |
| 2010/0040015 A1* | 2/2010 | Ernstrom | H04W 56/00 370/330 |

(Continued)

FOREIGN PATENT DOCUMENTS

WO  2017052596 A1  3/2017

OTHER PUBLICATIONS

Kouzayha, Nour, Zaher Dawy, and Jeffrey G Andrews; "Analysis of a Power Efficient Wake-up Soution for M2M Over Cellular Using Stochastic Geometry"; 2016 IEEE Global Communications Conference (GLOBECON); Dec. 31, 2016.

(Continued)

*Primary Examiner* — Alex Skripnikov

(57) ABSTRACT

In order to improve the wake-up signal (WUS) detection performance for MTC UE devices, a set of neighboring base stations coordinate to simultaneously transmit a common wake-up signal (CWUS). The CWUS is transmitted from the base stations utilizing a common set of time/frequency resources. A user equipment (UE) device receives the CWUSs from a plurality of base stations and combines the received CWUSs. In some examples, the UE device coherently combines the received CWUSs. The UE device utilizes the combined CWUSs to determine when the UE device may skip monitoring of the Paging Occasions within a Paging Time Window (PTW) to conserve power.

20 Claims, 6 Drawing Sheets

(51) Int. Cl.
  *H04L 27/26* (2006.01)
  *H04W 68/00* (2009.01)

(56) References Cited

U.S. PATENT DOCUMENTS

| | | |
|---|---|---|
| 2014/0335871 A1 | 11/2014 | Doppler et al. |
| 2015/0036576 A1 | 2/2015 | Jafarian et al. |
| 2015/0078292 A1 | 3/2015 | Walker et al. |
| 2015/0341911 A1 | 11/2015 | Wakabayashi et al. |
| 2017/0111866 A1 | 4/2017 | Park et al. |
| 2017/0280498 A1* | 9/2017 | Min .................. H04L 5/0053 |
| 2020/0053647 A1* | 2/2020 | Chae ................ H04W 72/0446 |
| 2021/0153120 A1* | 5/2021 | Atungsiri ............ H04L 27/2613 |

OTHER PUBLICATIONS

Qualcomm Incorporated; "Further discussion on WUS configurations and procedures," R1-1720423; 3GPP TSG-RAN WG1 Meeting #91; Nov. 27-Dec. 1, 2017; Reno, US.

Ericsson; "WF on Power Saving Signal Configuration for DL Channel in NB-IoT," R1-1721149; 3GPP TSG-RAN WG1 Meeting #91; Nov. 27-Dec. 1, 2017; Reno, US.

Huawei; "Report on email discussion [99bis#35][NB-IoT/MTC] on wake-up signal," R2-1713186; 3GPP TSG-RAN WG2 Meeting #100; Nov. 27-Dec. 1, 2017; Reno, US.

Vivo; "Remaining issues for wake-up signal for efeMTC," R1-1719754; 3GPP TSG-RAN WG1 Meeting #91; Nov. 18, 2017; Reno, US.

Vivo; "Remaining issues for wake-up signal for efeMTC," R1-1717456; 3GPP TSG-RAN WG1 Meeting #90bis; Sep. 30, 2017; Prague, CZ.

Vivo; "Views on design of wake-up signal for feNB-IOT," R1-1717458; 3GPP TSG-RAN WG1 Meeting #90bis; Sep. 30, 2017; Prague, CZ.

\* cited by examiner

500

START
↓

| 502 — TRANSMIT, DURING A FIRST SUBFRAME FROM A SERVING BASE STATION AND FROM A NEIGHBORING BASE STATION, A FIRST COMMON WAKE-UP SIGNAL TO A FIRST UE DEVICE UTILIZING A FIRST COMMON SET OF TIME/FREQUENCY RESOURCES, THE FIRST COMMON WAKE-UP SIGNAL COMPRISING A FIRST IDENTIFIER ASSOCIATED WITH THE SERVING BASE STATION |

↓

| 504 — TRANSMIT, DURING A SECOND SUBFRAME FROM THE SERVING BASE STATION AND FROM THE NEIGHBORING BASE STATION, A SECOND COMMON WAKE-UP SIGNAL TO A SECOND UE DEVICE UTILIZING A SECOND COMMON SET OF TIME/FREQUENCY RESOURCES, THE SECOND COMMON WAKE-UP SIGNAL COMPRISING A SECOND IDENTIFIER ASSOCIATED WITH THE NEIGHBORING BASE STATION |

↓

| 506 — RECEIVE, AT THE FIRST UE DEVICE, THE FIRST COMMON WAKE-UP SIGNALS TRANSMITTED FROM THE SERVING BASE STATION AND FROM THE NEIGHBORING BASE STATION DURING THE FIRST SUBFRAME |

↓

| 508 — COMBINE, AT THE FIRST UE DEVICE, THE RECEIVED FIRST COMMON WAKE-UP SIGNALS |

↓

| 510 — UTILIZE THE COMBINED FIRST COMMON WAKE-UP SIGNALS TO TRIGGER THE FIRST UE DEVICE TO MONITOR A PAGING OCCASION |

FIG. 5

INCREASING MTC DEVICE POWER-CONSUMPTION EFFICIENCY BY USING COMMON WAKE-UP SIGNAL

CLAIM OF PRIORITY

The present application claims priority to U.S. Provisional Application No. 62/607,196 filed on Dec. 18, 2017, and U.S. Provisional Application No. 62/757,900 filed on Nov. 9, 2018, and assigned to the assignee hereof.

FIELD

This invention generally relates to wireless communications and more particularly to transmitting wake-up signals to user equipment devices.

BACKGROUND

In a wireless network, a user equipment (UE) device is required to maintain an accurate symbol timing synchronization with its serving base station. The network synchronization is needed for the UE device to correctly decode the downlink signals received from the serving base station. The UE device listens to the serving base station's synchronization signal to adjust the internal clock of the UE device to track the symbol and frame time boundaries.

In order to save power, the UE device periodically turns OFF its transceiver and enters a sleep state. The UE device periodically wakes up from the sleep state to check whether a page message was received from the serving base station. If the UE device receives a page, then the UE device remains ON to receive the subsequent control and data signals.

Obviously, the UE device reduces its battery-consumption the longer the UE device remains asleep. However, the UE device remaining in a long duration sleep state results in the UE device internal clock drifting away from the nominal timing value. Therefore, every time the UE device wakes up, the UE device must reacquire the symbol timing before checking the page message.

Typically, the UE device takes a longer time to resynchronize than the time required for the UE device to receive and decode the page message. This resynchronization time becomes a much larger overhead for the Machine-type-Communications (MTC) UE devices. For example, to achieve a long battery life (e.g., 10-15+ years), which is an important aspect for the MTC networks, the MTC devices have a much longer sleep-cycle.

In fact, the sleep-cycle of some MTC devices can be between several minutes and several hours. Such a long sleep results in much larger clock-drifts for the MTC UE device. In addition, the MTC devices may operate in deep coverage areas where the downlink received signal strength is very low. In extreme scenarios, the received signal strength at the MTC devices could be as low as Signal-to-noise ratio (SNR)=−14 dB.

Having a large clock-drift and receiving a signal at very low signal strength forces the MTC UE devices to take several hundreds of milliseconds to acquire the network timing upon waking up. The reason it takes such a long time to detect the correct timing is that an MTC UE device has to wait to receive and accumulate multiple repetitions of the synchronization signal, which the MTC UE device combines in order to achieve a higher SNR. For example, according to the existing MTC Long Term Evolution (LTE) standard, an MTC UE device would require approximately 80 Primary Synchronization Signal (PSS) or Secondary Synchronization Signal (SSS) subframes to acquire the network timing after waking up. With a PSS/SSS subframe transmitted every 5 ms, 80 PSS/SSS subframes=400 ms that are required for the MTC UE device to obtain resynchronization. After obtaining resynchronization, it only takes a couple of milliseconds for the MTC UE device to decode the Physical Downlink Control Channel (PDCCH) to check for a page message indication.

SUMMARY

In order to improve the wake-up signal (WUS) detection performance for MTC UE devices, a set of neighboring base stations coordinate to simultaneously transmit a common wake-up signal (CWUS). The CWUS is transmitted from the base stations utilizing a common set of time/frequency resources. A user equipment (UE) device receives the CWUSs from a plurality of the base stations and combines the received CWUSs. In some examples, the UE device coherently combines the received CWUSs. The UE device utilizes the combined CWUSs to determine when the UE device may skip monitoring of the Paging Occasions within a Paging Time Window (PTW) to conserve power.

BRIEF DESCRIPTION OF THE DRAWINGS

FIG. 5 is a flowchart of an example of a method in which a serving base station and a neighboring base station both transmit a first CWUS during a first subframe, utilizing a first common set of time/frequency resources. The serving base station and the neighboring base station both transmit a second CWUS during a second subframe, utilizing a second common set of time/frequency resources.

DETAILED DESCRIPTION

Figure 1A:
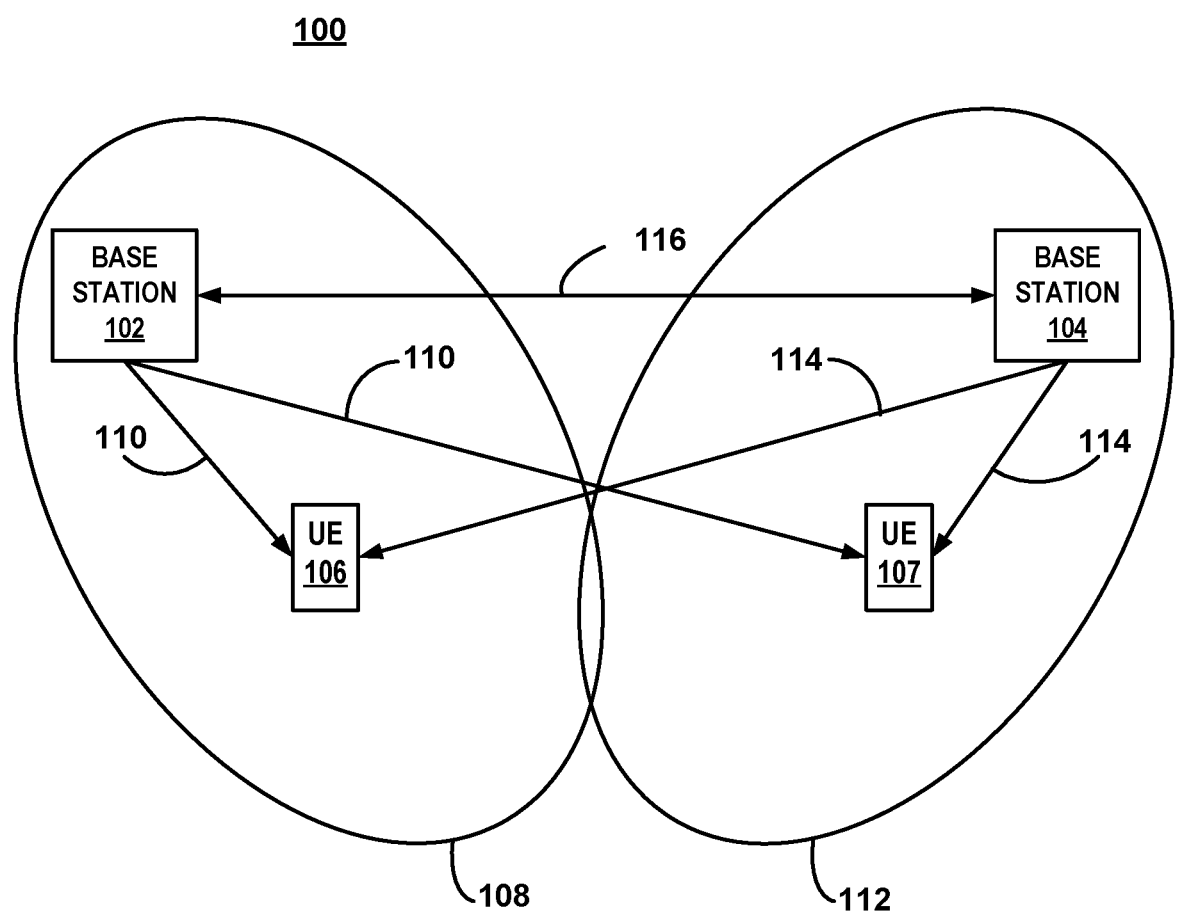
FIG. 1A is a block diagram of a communication system for an example in which a serving base station and a neighboring base station both transmit a common wake-up signal (CWUS) utilizing a common set of time/frequency resources.

A Machine-type-Communications (MTC) user equipment (UE) device that is in a sleep state periodically wakes up from the sleep state to check whether a page message was received from its serving base station. Upon waking, the UE device warms up its transceiver and attempts to obtain resynchronization before checking the Physical Downlink Control Channel (PDCCH) for a page message indication. Although the resynchronization signal is beneficial for the MTC UE device to acquire the pages transmitted via the PDCCH, it is likely that no pages are sent during the Paging Occasion (PO). Due to the large number of searches involved in decoding the possible pages within the PDCCH, it would be beneficial for the serving base station to send a Wake-up Signal (WUS) in advance of the PO.

In some examples, the WUS would be a 1-bit signal that indicates to MTC UE devices whether a page will be sent during the PO. Thus, in the examples discussed below, if the common wake-up signal (CWUS) indicates that no page will be sent during the PO, the UE devices will return to the sleep state without decoding the PDCCH. If the CWUS indicates that a page will be sent during the PO, the UE devices will decode the PDCCH to obtain the page message.

In operation, the WUS is applicable for all MTC UE devices that monitor the WUS in a particular time slot. For normal discontinuous reception (DRX) operation, MTC UE devices may be configured to sleep for up to 10.24 s between paging cycles and monitor POs within a Paging Frame. However, this is insufficient for MTC UE devices that are intended to have a battery life that can last for multiple years.

With eDRX (Extended DRX), MTC UE devices may be configured to stay asleep for an extended period of time or hyper frames of 10.24 s (up to 43.69 minutes). With eDRX, it may also be necessary for the Paging Time Window (PTW) length to be configured for a sufficiently long enough time in case the MTC UE device's internal clock is severely desynchronized with the base station. Therefore, it is necessary to provide the MTC UE device with sufficient POs within a large PTW, which can be configured in multiples of seconds by the upper layer, in accordance with 3rd Generation Partnership Project Long Term Evolution (3GPP) Technical Specification 36.304. However, as mentioned above, if the MTC UE device receives a "No Page" indication based on the received CWUS, the MTC UE device will not need wake up to decode any of the POs within the PTW.

As described herein, in order to improve the WUS detection performance for MTC UE devices, a set of neighboring base stations coordinate to simultaneously transmit a common wake-up signal (CWUS). As used herein, the term "common" is intended to mean "the same." The higher CWUS detection performance increases the likelihood that the MTC UE devices will be able to successfully decode the CWUS. However, if an MTC UE device cannot successfully decode the CWUS, the MTC UE device will proceed to decode the POs within the next PTW, which means the MTC UE device will not be able to conserve power by staying in the sleep mode.

The set of neighboring base stations all transmit the CWUS in the same predetermined specific time-frequency resource locations within a subframe/frame so that the MTC UE devices can detect the CWUS correctly. Each MTC UE device receiver constructively combines the energy of the multiple copies of the received CWUS from the different base stations. The combined CWUSs have a much higher received power with a greater Signal-to-noise ratio (SNR), which improves CWUS detection performance.

FIG. 1A is a block diagram of a communication system for an example in which a serving base station and a neighboring base station both transmit a common wake-up signal (CWUS) utilizing a common set of time/frequency resources. The communication system 100 is part of a radio access network (not shown) that provides various wireless services to UE devices that are located within the respective service areas of the various base stations that are part of the radio access network.

In the interest of clarity and brevity, communication system 100 is shown as having only base station 102 and base station 104. However, in other examples, communication system 100 could have any suitable number of base stations. In the example of FIG. 1A, at least a portion of the service area (cell) for base station 102 is represented by cell 108, and at least a portion of the service area (cell) for base station 104 is represented by cell 112. Cells 108, 112 are represented by ovals, but a typical communication system 100 would have a plurality of cells, each having variously shaped geographical service areas.

Base stations 102, 104, sometimes referred to as eNodeBs or eNBs, communicate with the wireless user equipment (UE) devices 106, 107 by respectively transmitting downlink signals 110, 114 to the UE devices 106, 107. In the case of implementations that utilize the 5G New Radio air interface, the base station is sometimes referred to as a gNB. Base stations 102, 104 also receive uplink signals (not shown) transmitted from the UE devices 106, 107, respectively. As used herein, the terms "base station" and "cell" are interchangeable. In some cases, the serving cell is provided by a first base station, and the neighboring cell is provided by a second base station. However, in other cases, a serving cell and a neighboring cell may be provided by the same base station.

Figure 2A:
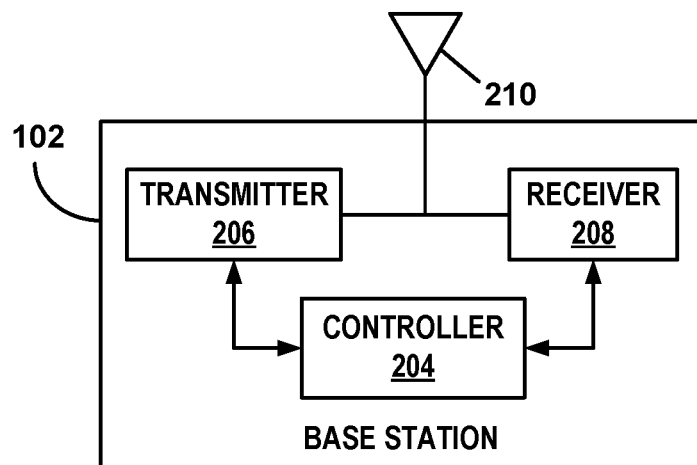
FIG. 2A is a block diagram of an example of the base stations shown in FIGS. 1A and 1B.

Base stations 102, 104 are connected to the network through a backhaul (not shown) in accordance with known techniques. As shown in FIG. 2A, base station 102 comprises controller 204, transmitter 206, and receiver 208, as well as other electronics, hardware, and code. Although FIG. 2A specifically depicts the circuitry and configuration of base station 102, the same base station circuitry and configuration is utilized for base station 104 in the example shown in FIG. 1A. In other examples, either of the base stations may have circuitry and/or a configuration that differs from that of the base station 102 shown in FIG. 2A.

The base station 102 is any fixed, mobile, or portable equipment that performs the functions described herein. The various functions and operations of the blocks described with reference to the base station 102 may be implemented in any number of devices, circuits, or elements. Two or more of the functional blocks may be integrated in a single device, and the functions described as performed in any single device may be implemented over several devices.

For the example shown in FIG. 2A, the base station 102 may be a fixed device or apparatus that is installed at a particular location at the time of system deployment. Examples of such equipment include fixed base stations or fixed transceiver stations. In some situations, the base station 102 may be mobile equipment that is temporarily installed at a particular location. Some examples of such equipment include mobile transceiver stations that may include power generating equipment such as electric generators, solar panels, and/or batteries. Larger and heavier versions of such equipment may be transported by trailer. In still other situations, the base station 102 may be a portable device that is not fixed to any particular location. Accordingly, the base station 102 may be a portable user device such as a UE device in some circumstances.

The controller 204 includes any combination of hardware, software, and/or firmware for executing the functions described herein as well as facilitating the overall functionality of the base station 102. An example of a suitable controller 204 includes code running on a microprocessor or processor arrangement connected to memory. The transmitter 206 includes electronics configured to transmit wireless signals. In some situations, the transmitter 206 may include multiple transmitters. The receiver 208 includes electronics configured to receive wireless signals. In some situations, the receiver 208 may include multiple receivers. The receiver 208 and transmitter 206 receive and transmit signals, respectively, through an antenna 210. The antenna 210 may include separate transmit and receive antennas. In some circumstances, the antenna 210 may include multiple transmit and receive antennas.

The transmitter 206 and receiver 208 in the example of FIG. 2A perform radio frequency (RF) processing including modulation and demodulation. The receiver 208, therefore, may include components such as low noise amplifiers (LNAs) and filters. The transmitter 206 may include filters and amplifiers. Other components may include isolators, matching circuits, and other RF components. These components in combination or cooperation with other components perform the base station functions. The required components may depend on the particular functionality required by the base station.

The transmitter 206 includes a modulator (not shown), and the receiver 208 includes a demodulator (not shown). The modulator modulates the signals to be transmitted as part of the downlink signals 110 and can apply any one of a plurality of modulation orders. The demodulator demodulates any uplink signals received at the base station 102 in accordance with one of a plurality of modulation orders.

Returning to FIG. 1A, the communication system 100 provides various wireless services to UE devices 106, 107 via base stations 102, 104. For the examples herein, the communication system 100 operates in accordance with at least one revision of the 3rd Generation Partnership Project Long Term Evolution (3GPP LTE) communication specification. In other examples, the communication system 100 operates in accordance with at least one revision of the 5G New Radio communication specification.

For the examples herein, the systems and methods will be described mainly from the perspective of UE device 106. Thus, any references to the "serving base station" are intended to refer to base station 102, which is the serving base station for UE device 106, unless stated otherwise. Similarly, any references to the "neighboring base station" are intended to refer to base station 104, which is a neighboring base station for UE device 106, unless stated otherwise. However, it should be understood that any of the features, functionality, etc. of UE device 106 are also applicable to UE device 107, for which base station 104 is the serving base station and base station 102 is the neighboring base station.

Figure 2B:
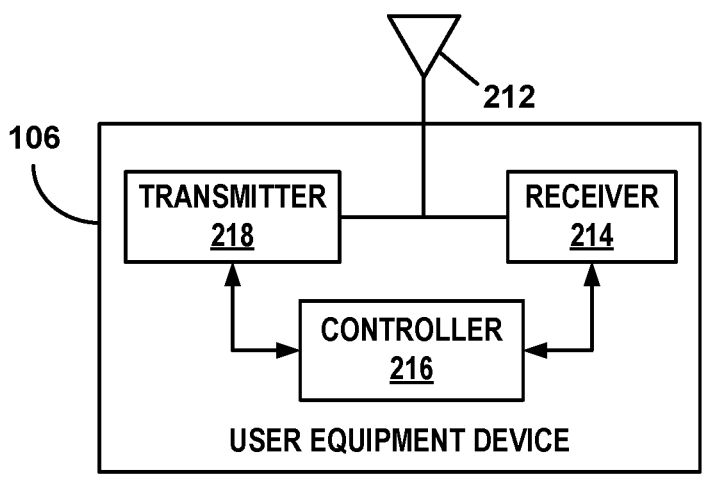
FIG. 2B is a block diagram of an example of the UE devices shown in FIGS. 1A and 1B.

UE device 106 is served by serving base station 102 and, thus, receives downlink signals 110 via antenna 212 and receiver 214, as shown in FIG. 2B. Besides antenna 212 and receiver 214, UE device 106 further comprises controller 216 and transmitter 218, as well as other electronics, hardware, and code. Although FIG. 2B specifically depicts the circuitry and configuration of UE device 106, the same UE device circuitry and configuration is utilized for UE device 107 in communication system 100. In other examples, either of the UE devices may have circuitry and/or a configuration that differs from that of the UE device 106 shown in FIG. 2B.

In the example shown in FIG. 1A, the communication link between the UE device 106 and the base station (eNB) 102 is a Uu link, which is configured to provide downlink communication from the base station 102 to the UE device 106 and to provide uplink communication from the UE device 106 to the base station 102. A similar communication link exists between UE device 107 and the base station 104.

In some examples, the UE devices 106, 107 are any wireless communication devices such as a mobile phone, a transceiver modem, a personal digital assistant (PDA), a tablet, or a smartphone. In other examples, UE devices 106, 107 are MTC UE devices. Thus, the UE devices 106, 107 are any fixed, mobile, or portable equipment that performs the functions described herein. The various functions and operations of the blocks described with reference to UE device 106 may be implemented in any number of devices, circuits, or elements. Two or more of the functional blocks may be integrated in a single device, and the functions described as performed in any single device may be implemented over several devices.

The controller 216 includes any combination of hardware, software, and/or firmware for executing the functions described herein as well as facilitating the overall functionality of a UE device. An example of a suitable controller 216 includes code running on a microprocessor or processor arrangement connected to memory. The transmitter 218 includes electronics configured to transmit wireless signals. In some situations, the transmitter 218 may include multiple transmitters. The receiver 214 includes electronics configured to receive wireless signals. In some situations, the receiver 214 may include multiple receivers. The receiver 214 and transmitter 218 receive and transmit signals, respectively, through antenna 212. The antenna 212 may include separate transmit and receive antennas. In some circumstances, the antenna 212 may include multiple transmit and receive antennas.

The transmitter 218 and receiver 214 in the example of FIG. 2B perform radio frequency (RF) processing including modulation and demodulation. The receiver 214, therefore, may include components such as low noise amplifiers (LNAs) and filters. The transmitter 218 may include filters and amplifiers. Other components may include isolators, matching circuits, and other RF components. These components in combination or cooperation with other components perform the UE device functions. The required components may depend on the particular functionality required by the UE device.

The transmitter 218 includes a modulator (not shown), and the receiver 214 includes a demodulator (not shown). The modulator can apply any one of a plurality of modulation orders to modulate the signals to be transmitted as part of the uplink signals (not shown). The demodulator demodulates the downlink signals 110, 114 in accordance with one of a plurality of modulation orders.

In operation, the UE device 106 is served by base station 102. Thus, upon receipt of the downlink signals 110, the UE device 106 demodulates the downlink signals 110, which yields encoded data packets that contain data pertaining to at least one of the wireless services that the serving base station 102 is providing to the UE device 106. The UE device 106 decodes the encoded data packets, using controller 216, to obtain the data.

In the example shown in FIG. 1A, a set of neighboring base stations 102, 104 coordinate to simultaneously transmit at least one common wake-up signal (CWUS). The base stations 102, 104 coordinate via communication link 116, which can be a wired connection (e.g., X2) or a wireless connection. For example, the base stations 102, 104 coordinate with each other regarding the common set of time/frequency resources that will be utilized by both base stations 102, 104 to transmit the CWUS. In some examples, the common set of time/frequency resources are predetermined Multimedia Broadcast Single Frequency Network (MBSFN) subframes. Additionally, the CWUS transmission from the serving base station 102 and the CWUS transmission from the neighboring base station 104 may utilize an extended cyclic prefix, in some examples.

The serving base station 102 may also broadcast, via its transmitter 206 and antenna 210, information (e.g., CWUS configuration information) required by UE device 106 to receive the CWUS from the serving base station 102 and the neighboring base station 104. The broadcast information may, in some examples, include time/frequency resource location information for the CWUS. However, in other examples, the serving base station 102 may not have to broadcast information regarding the time/frequency resource location if the CWUS is broadcasted periodically and all the UE devices being served by the base stations 102, 104 are aware of the periodicity of the CWUS broadcast. In some examples, the broadcast information is broadcast by base station 102 in a System Information Block (SIB) message to UE device 106.

The SIB message provides the CWUS configuration information to the UE device 106. In some examples, the SIB message includes an indication of whether the serving cell(s) will be transmitting the CWUS instead of a single-cell WUS. The SIB message could also include an indication of how many times the CWUS is repeated in one CWUS occasion (e.g., an occasion during which the set of neighboring base stations 102, 104 simultaneously transmit one or more CWUSs). Both of these pieces of information can help the UE devices decide whether to achieve accurate synchronization timing before detecting the CWUS.

In addition to the above information, the SIB message could also include an indication of whether the WUS is scrambled with a cell identifier associated with a particular cell. This is important because if the WUS is not scrambled with a cell identifier, then the WUS could be shorter and helps in lowering the UE device energy consumption. A shorter WUS that is not scrambled with a cell identifier is possible because the time-slots for CWUS transmissions are coordinated between the serving cell and the neighboring cell so that each cell is assigned time-slots that are not being used by the neighboring cells.

Figure 3A:
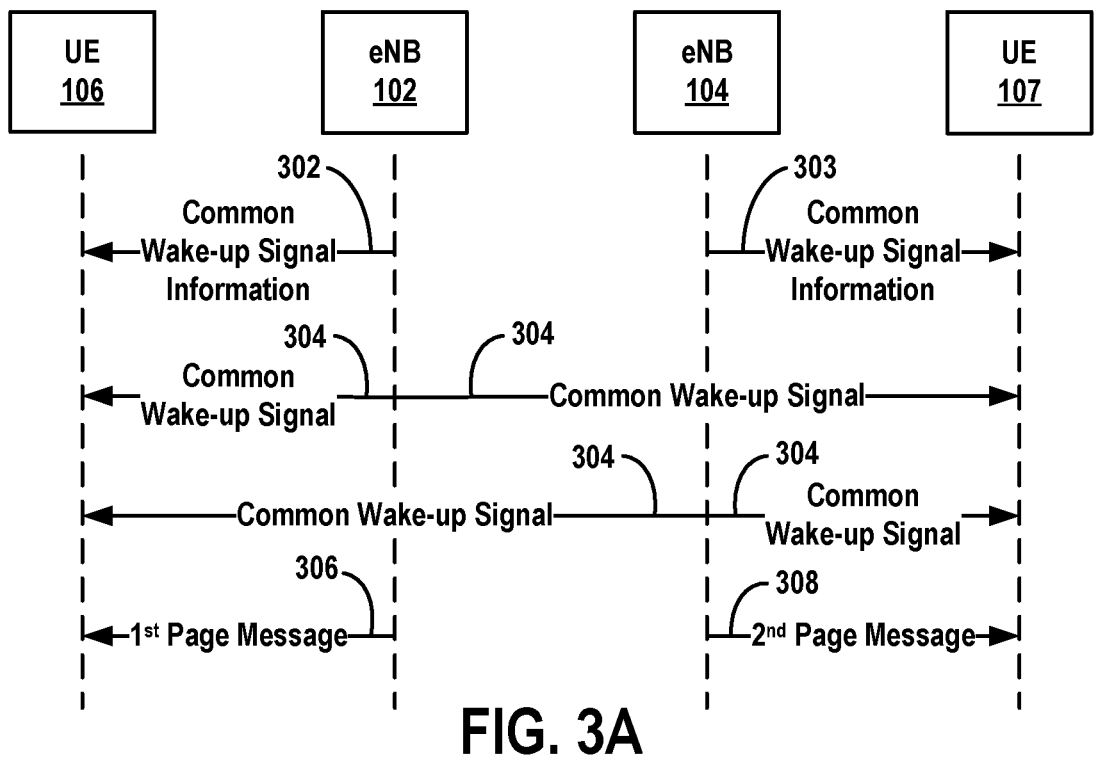
FIG. 3A is a messaging diagram of an example of the messages exchanged between the various system components shown in FIG. 1A.

The UE device 106 receives the broadcast information via its antenna 212 and receiver 214. The UE device 106 utilizes the broadcast information to receive and decode the CWUS that will be transmitted by its serving base station 102 and the neighboring base station 104. If there are other UE devices in cell 108, the other UE devices may also receive the broadcast information and utilize it to receive the CWUS that will be transmitted by base station 102 and base station 104. In FIG. 3A, the signal that represents base station 102 broadcasting information required by UE device 106 to receive the CWUS is represented by signal 302.

Base station 104 may also broadcast information, similar to the information broadcast by base station 102, which is required by UE device 107 to receive the CWUS from base station 102 and base station 104. The UE device 107 receives the broadcast information via its antenna 212 and receiver 214. The UE device 107 utilizes the broadcast information to receive and decode the CWUS that will be transmitted by base station 102 and base station 104. If there are other UE devices in cell 112, the other UE devices may also receive the broadcast information and utilize it to receive the CWUS that will be transmitted by base station 102 and base station 104. In FIG. 3A, the signal that represents base station 104 broadcasting information required by UE device 107 to receive the CWUS is represented by signal 303.

In the example of FIG. 1A, the UE device 106 wakes up from a sleep state to check for a page message from the serving base station 102. Upon waking, the UE device 106 warms up its transceiver (e.g., transmitter 218 and receiver 214) and attempts to obtain resynchronization before checking the Physical Downlink Control Channel (PDCCH) for a page message indication. Although the resynchronization signal (not shown) is beneficial for the UE device 106 to acquire the pages transmitted via the PDCCH, it is likely that no pages are sent during any of the Paging Occasions (POs) within the Paging Time Window (PTW).

Due to the large number of searches involved in decoding the possible pages within the PDCCH, it is beneficial for the serving base station 102 to send a Wake-up Signal (WUS) in advance of the PTW. In some examples, the WUS is a 1-bit signal that indicates to UE device 106 whether a page will be sent during the PTW. However, the WUS is applicable for all MTC UE devices that monitor the WUS in a particular time slot.

Thus, as described herein, in order to improve the WUS detection performance for MTC UE devices, the serving base station 102 transmits, via its transmitter 206 and antenna 210, a common wake-up signal (CWUS) to UE device 106. Neighboring base station 104 also transmits, via its transmitter 206 and antenna 210, the CWUS to the UE device 106, which is being served by serving base station 102. As used herein, the term "common" is intended to mean "the same."

The transmission of the CWUS by the serving base station 102 and the transmission of the CWUS by the neighboring base station 104 occur simultaneously. For example, base station 102 would transmit the CWUS, via downlink signal 110, to UE device 106, and base station 104 would simultaneously transmit the CWUS, via downlink signal 114, to UE device 106. In some examples, base station 102 and base station 104 also transmit the CWUS to UE device 107. The signals that represent base station 102 and base station 104 simultaneously transmitting the CWUS to UE devices 106 and 107 are represented by signals 304 in FIG. 3A. Although the transmission of the CWUS from base station 104 may appear as occurring after the transmission of the CWUS from base station 102 in FIG. 3A, the transmissions of the CWUS are intended to occur simultaneously from both base stations 102, 104. The coordination between neighboring base stations 102, 104 to transmit the CWUS also has the underlying benefit that the neighboring base stations 102, 104 will not transmit other non-CWUS signals in the same time/frequency that may interfere with the UE device's reception of the CWUS sent from the UE device's serving base station 102.

In the example shown in FIG. 1A, the transmission of the CWUS from the serving base station 102 and the transmission of the CWUS from the neighboring base station 104 both utilize a common set of time/frequency resources. In some examples, the transmitter 206 of the serving base station 102 is configured to boost the transmit power of the CWUS transmission from the serving base station 102. Similarly, in some examples, the transmitter 206 of the neighboring base station 104 is configured to boost the transmit power of the CWUS transmission from the neighboring base station 104.

The UE device 106 receives, via its antenna 212 and receiver 214, the CWUS transmitted from the serving base station 102 and the CWUS transmitted from the neighboring base station 104. The controller 216 of the UE device 106 combines the received CWUSs. In some examples, the controller 216 of the UE device 106 coherently combines the received CWUSs, which means that the controller 216 of the UE device 106 utilizes a timing mechanism (e.g., carrier phase information) to receive and then combine the received CWUSs.

The combined CWUSs have a much higher received power with a greater Signal-to-noise ratio (SNR), which improves CWUS detection performance. The higher CWUS detection performance improves the robustness of the CWUS reception and prevents unnecessary monitoring of the POs within the Paging Time Window to reduce power consumption.

The controller 216 of the UE device 106 utilizes the combined CWUSs to determine whether to trigger the UE device 106 to monitor a Paging Occasion within a Paging Time Window. If the common wake-up signal (CWUS) indicates that no page will be sent in a PO within the next Paging Time Window, the UE devices will return to the sleep state without decoding the PDCCH. If the CWUS indicates that a page will be sent during a PO within the next Paging Time Window, the UE devices will decode the PDCCH to obtain the page message.

If the CWUS indicates that a page will be sent during a PO within the next Paging Time Window and the UE device 106 receives a first page message from the serving base station 102 during the Paging Occasion, the UE device 106 verifies that the page message contains a UE device identifier (UE-ID) that is associated with the UE device 106. Upon verification that the page message contains the UE-ID associated with the UE device 106, the UE device 106 remains ON to receive subsequent control and data signals. The signal containing the first page message transmitted from the serving base station 102 to the UE device 106 is represented by signal 306 in FIG. 3A.

Similarly, the controller 216 of the UE device 107 utilizes the combined CWUSs to determine whether to trigger the UE device 107 to monitor a Paging Occasion within the Paging Time Window. As described above, if the common wake-up signal (CWUS) indicates that no page will be sent in a PO within the next Paging Time Window, the UE devices will return to the sleep state without decoding the PDCCH. If the CWUS indicates that a page will be sent during a PO within the next Paging Time Window, the UE devices will decode the PDCCH to obtain the page message.

If the CWUS indicates that a page will be sent during a PO within the next Paging Time Window and the UE device 107 receives a page message from the base station 104 during the Paging Occasion, the UE device 107 verifies that the page message contains a UE device identifier (UE-ID) that is associated with the UE device 107. Upon verification that the page message contains the UE-ID associated with the UE device 107, the UE device 107 stays ON to receive subsequent control and data signals. The signal containing the page message transmitted from base station 104 to the UE device 107 is represented by signal 308 in FIG. 3A. In some examples, the base stations 102, 104 may be configured to transmit the page messages in a synchronized format, much like the CWUS, but such a configuration would require additional network coordination to ensure that the coding within the PDCCH is shared among the base stations 102, 104.

If the UE device 106 does not receive a page from the serving base station 102 during the Paging Occasion, then the UE device 106 turns OFF its transceiver and re-enters a sleep state. Similarly, if the UE device 107 does not receive a page from base station 104 during the Paging Occasion, then the UE device 107 turns OFF its transceiver and re-enters a sleep state.

Although the foregoing discussion only included two base stations 102, 104 in the set of base stations that coordinate simultaneous transmission of the CWUS, communication system 100 may include any suitable number of base stations that can all coordinate with each other to simultaneously transmit the CWUS.

In other examples, a first set of base stations (e.g., the serving base station 102 and the neighboring base station 104) may be assigned to a first Common Synchronization Channel (CSCH) area that utilizes a first CWUS, and a second set of base stations (not shown) may be assigned to a second CSCH area that utilizes a second CWUS that is different than the first CWUS. For example, the first CWUS may utilize a first common set of time/frequency resources, and the second CWUS may utilize a second common set of time/frequency resources that are different than the first common set of time/frequency resources.

Figure 1B:
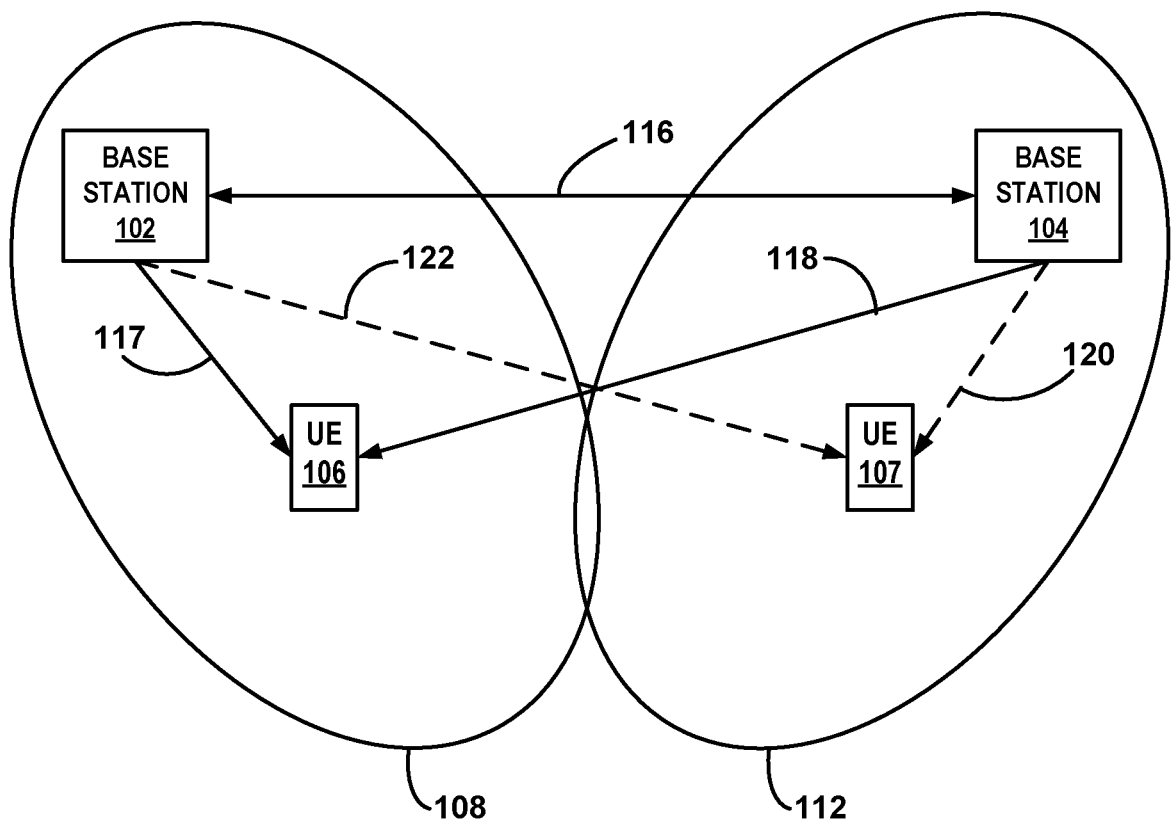
FIG. 1B is a block diagram of a communication system for an example in which a serving base station and a neighboring base station both transmit a first CWUS during a first subframe, utilizing a first common set of time/frequency resources. The serving base station and the neighboring base station both transmit a second CWUS during a second subframe, utilizing a second common set of time/frequency resources.

In the example shown in FIG. 1B, a set of neighboring base stations 102, 104 coordinate to simultaneously transmit a first CWUS during a first subframe, utilizing a first common set of time/frequency resources. The base stations 102, 104 both simultaneously transmit a second CWUS during a second subframe, utilizing a second common set of time/frequency resources. The base stations 102, 104 coordinate via communication link 116, which can be a wired connection (e.g., X2) or a wireless connection. For example, the base stations 102, 104 coordinate with each other regarding (1) the first common set of time/frequency resources that will be utilized by both base stations 102, 104 to transmit the first CWUS, and (2) the second common set of time/frequency resources that will be utilized by both base stations 102, 104 to transmit the second CWUS.

The first CWUS is different than the second CWUS. In some examples, the first CWUS includes a first identifier that is associated with base station 102, and the second CWUS includes a second identifier that is associated with base station 104. In some examples, the first common set of time/frequency resources utilized to transmit the first CWUS is different than the second common set of time/frequency resources utilized to transmit the second CWUS. In still other examples, the first common set of time/frequency resources and the second common set of time/frequency resources are predetermined Multimedia Broadcast Single Frequency Network (MBSFN) subframes. Additionally, the first and/or second CWUS transmissions from the base stations 102, 104 may utilize an extended cyclic prefix, in some examples.

The serving base station 102 may also broadcast, via its transmitter 206 and antenna 210, information required by UE device 106 to receive the first CWUS from the serving base station 102 and the neighboring base station 104 during the first subframe. The broadcast information may, in some examples, include time/frequency resource location information for the first CWUS. However, in other examples, the serving base station 102 may not have to broadcast information regarding the first CWUS if the first CWUS has been preconfigured. Similarly, the time/frequency resource location information for the first CWUS may not need to be broadcasted if the first CWUS is broadcasted periodically and all the UE devices being served by the serving base station 102 are aware of the periodicity of the first CWUS broadcast. In some examples, the broadcast information is broadcast by base station 102 in a System Information Block (SIB) message to UE device 106.

Figure 3B:
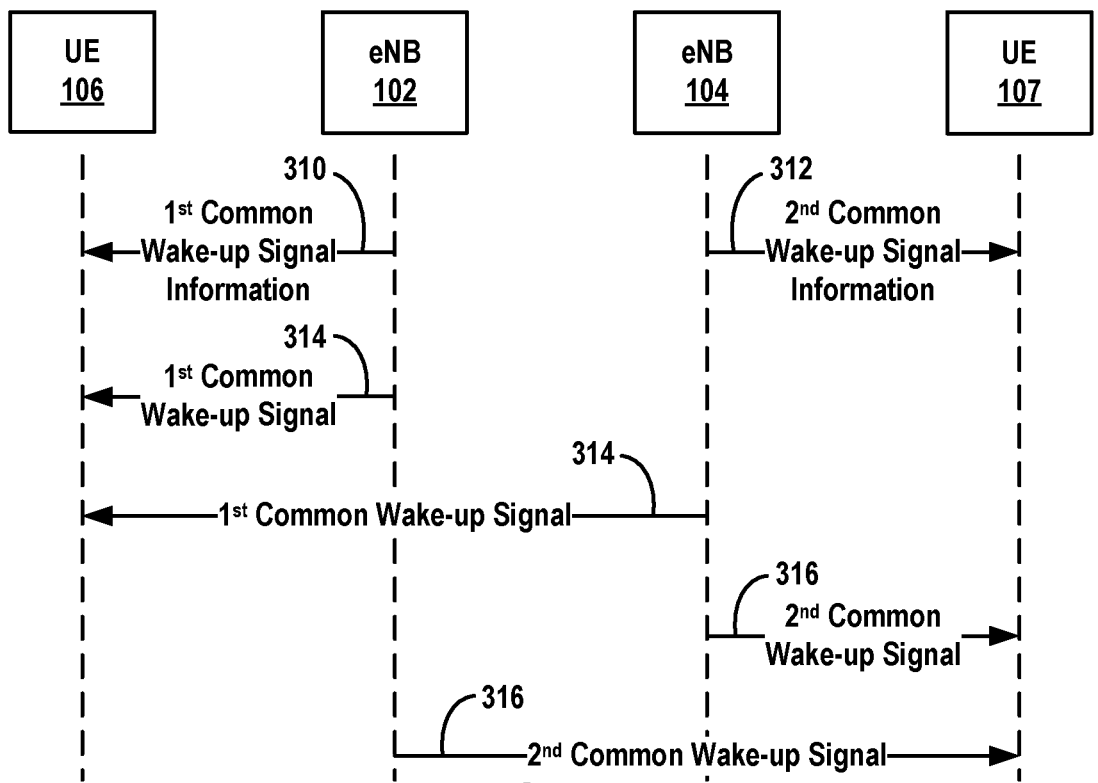
FIG. 3B is a messaging diagram of an example of the messages exchanged between the various system components shown in FIG. 1B.

The UE device 106 receives, via its antenna 212 and receiver 214, the broadcast information from base station 102. The UE device 106 utilizes the broadcast information to receive and decode the first CWUS that will be transmitted by its serving base station 102 and the neighboring base station 104 during the first subframe. If there are other UE devices in cell 108, the other UE devices may also receive the broadcasted information and utilize it to receive the first CWUS that will be transmitted by base station 102 and base station 104 during the first subframe. In FIG. 3B, the signal that represents base station 102 broadcasting information required by UE device 106 to receive the first CWUS is represented by signal 310.

Base station 104 may also broadcast, via its transmitter 206 and antenna 210, information required by UE device 107 to receive the second CWUS from its base station 104 and base station 102 during the second subframe. The broadcast information may, in some examples, include time/frequency resource location information for the second CWUS. However, in other examples, the base station 104 may not have to broadcast information regarding the second CWUS if the second CWUS has been preconfigured. Similarly, the time/frequency resource location information for the second CWUS may not need to be broadcasted if the second CWUS is broadcasted periodically and all the UE devices being served by base station 104 are aware of the periodicity of the second CWUS broadcast. In some examples, the broadcast information is broadcast by base station 104 in a System Information Block (SIB) message to UE device 107.

The UE device 107 receives, via its antenna 212 and receiver 214, the broadcast information from base station 104. The UE device 107 utilizes the broadcast information to receive and decode the second CWUS that will be transmitted by its base station 104 and base station 102 during the second subframe. If there are other UE devices in cell 112, the other UE devices may also receive the broadcast information and utilize it to receive the second CWUS that will be transmitted by base station 104 and base station 102 during the second subframe. In FIG. 3B, the signal that represents base station 104 broadcasting information required by UE device 107 to receive the second CWUS is represented by signal 312.

In the example of FIG. 1B, the UE device 106 wakes up from a sleep state to check for a page message from the serving base station 102. Upon waking, the UE device 106 warms up its transceiver (e.g., transmitter 218 and receiver 214) and attempts to obtain resynchronization before checking the Physical Downlink Control Channel (PDCCH) for a page message indication. Although the resynchronization signal (not shown) is beneficial for the UE device 106 to acquire the pages transmitted via the PDCCH, it is likely that no pages are sent during the Paging Occasions (POs) within the Paging Time Window (PTW).

Due to the large number of searches involved in decoding the possible pages within the PDCCH, it is beneficial for the serving base station 102 to send a Wake-up Signal (WUS) in advance of the PTW. In some examples, the WUS is a 1-bit signal that indicates to UE device 106 whether a page will be sent during the PTW. However, the WUS is applicable for all MTC UE devices that monitor the WUS in a particular time slot.

Thus, as described herein, in order to improve the WUS detection performance for MTC UE devices, the serving base station 102 transmits, via its transmitter 206 and antenna 210, a first common wake-up signal (CWUS) to UE device 106 during a first subframe. Neighboring base station 104 also transmits, via its transmitter 206 and antenna 210, the first CWUS to the UE device 106, which is being served by serving base station 102, during the first subframe. As used herein, the term "common" is intended to mean "the same."

The transmission of the first CWUS by the serving base station 102 and the transmission of the first CWUS by the neighboring base station 104 occur simultaneously during a first subframe. For example, base station 102 would transmit the first CWUS, via downlink signal 117 of FIG. 1B, to UE device 106, and base station 104 would simultaneously transmit the first CWUS, via downlink signal 118, to UE device 106. The signals that represent base station 102 and base station 104 simultaneously transmitting the first CWUS to UE device 106 during the first subframe are represented by signals 314 in FIG. 3B. Although the transmission of the first CWUS from base station 104 may appear as occurring after the transmission of the first CWUS from base station 102 in FIG. 3B, the transmissions of the first CWUS are intended to occur simultaneously from both base stations 102, 104.

In the example shown in FIG. 1B, the transmission of the first CWUS from the serving base station 102 and the transmission of the first CWUS from the neighboring base station 104 both utilize a first common set of time/frequency resources. In some examples, the transmitter 206 of the serving base station 102 is configured to boost the transmit power of the first CWUS transmission from the serving base station 102. Similarly, in some examples, the transmitter 206 of the neighboring base station 104 is configured to boost the transmit power of the first CWUS transmission from the neighboring base station 104.

The UE device 106 receives, via its antenna 212 and receiver 214, the first CWUS transmitted from the serving base station 102 and the first CWUS transmitted from the neighboring base station 104. The controller 216 of the UE device 106 combines the received first CWUSs. In some examples, the controller 216 of the UE device 106 coherently combines the received first CWUSs, which means that the controller 216 of the UE device 106 utilizes a timing mechanism (e.g., carrier phase information) to receive and then combine the received first CWUSs.

The combined first CWUSs have a much higher received power with a greater Signal-to-noise ratio (SNR), which improves CWUS detection performance. The higher CWUS detection performance improves the robustness of the CWUS reception and prevents unnecessary monitoring of the POs within the Paging Time Window to conserve power.

The controller 216 of the UE device 106 utilizes the combined first CWUSs to trigger the UE device 106 to monitor a Paging Occasion. In some examples, the base stations 102, 104 may be configured to transmit the page messages in a synchronized format, much like the CWUS, but such a configuration would require additional network coordination to ensure that the coding within the PDCCH is shared among the base stations 102, 104. Regardless of whether the page messages are sent by a single base station or by multiple base stations, if the UE device 106 receives a page message (not shown in FIG. 3B) from its serving base station 102 during the Paging Occasion and the UE device 106 verifies that the page message contains the UE-ID associated with the UE device 106, then the UE device 106 stays ON to receive subsequent control and data signals. However, if the UE device 106 does not receive a page from the serving base station 102 during the Paging Occasion, then the UE device 106 turns OFF its transceiver and re-enters a sleep state.

Similar to the UE device 106, the UE device 107 wakes up from a sleep state to check for a page message from base station 104. Upon waking, the UE device 107 warms up its transceiver (e.g., transmitter 218 and receiver 214) and attempts to obtain resynchronization before checking the Physical Downlink Control Channel (PDCCH) for a page message indication. Although the resynchronization signal (not shown) is beneficial for the UE device 107 to acquire the pages transmitted via the PDCCH, it is likely that no pages are sent during the Paging Occasion (PO).

As described above, in order to improve the WUS detection performance, base station 104 transmits, via its transmitter 206 and antenna 210, a second CWUS to UE device 107 during a second subframe. Base station 102 also transmits, via its transmitter 206 and antenna 210, the second CWUS to the UE device 107, which is being served by base station 104, during the second subframe.

The transmission of the second CWUS by base station 104 and the transmission of the second CWUS by base station 102 occur simultaneously during a second subframe. For example, base station 104 would transmit the second CWUS, via downlink signal 120 of FIG. 1B, to UE device 107, and base station 102 would simultaneously transmit the second CWUS, via downlink signal 122, to UE device 107. The signals that represent base station 104 and base station 102 simultaneously transmitting the second CWUS to UE device 107 during the second subframe are represented by signals 316 in FIG. 3B. Although the transmission of the second CWUS from base station 102 may appear as occurring after the transmission of the second CWUS from base station 104 in FIG. 3B, the transmissions of the second CWUS are intended to occur simultaneously from both base stations 102, 104.

In the example shown in FIG. 1B, the transmission of the second CWUS from base station 104 and the transmission of the second CWUS from base station 102 both utilize a second common set of time/frequency resources. In some examples, the transmitter 206 of base station 104 is configured to boost the transmit power of the second CWUS transmission from base station 104. Similarly, in some examples, the transmitter 206 of base station 102 is configured to boost the transmit power of the second CWUS transmission from base station 102.

The UE device 107 receives, via its antenna 212 and receiver 214, the second CWUS transmitted from base station 104 and the second CWUS transmitted from base station 102. The controller 216 of the UE device 107 combines the received second CWUSs. In some examples, the controller 216 of the UE device 107 coherently combines the received second CWUSs, which means that the controller 216 of the UE device 107 utilizes a timing mechanism (e.g., carrier phase information) to receive and then combine the received second CWUSs.

The combined second CWUSs have a much higher received power with a greater Signal-to-noise ratio (SNR), which improves CWUS detection performance. The higher CWUS detection improves the robustness of the CWUS reception and prevents unnecessary monitoring of the POs within the Paging Time Window to reduce power consumption.

The controller 216 of the UE device 107 utilizes the combined second CWUSs to trigger the UE device 107 to monitor a Paging Occasion. In some examples, the base stations 102, 104 may be configured to transmit the page messages in a synchronized format, much like the CWUS, but such a configuration would require additional network coordination to ensure that the coding within the PDCCH is shared among the base stations 102, 104. Regardless of whether the page messages are sent by a single base station or by multiple base stations, if the UE device 107 receives a page message (not shown in FIG. 3B) from base station 104 during the Paging Occasion and the UE device 107 verifies that the page message contains the UE-ID associated with the UE device 107, then the UE device 107 stays ON to receive subsequent control and data signals. However, if the UE device 107 does not receive a page from base station 104 during the Paging Occasion, then the UE device 107 turns OFF its transceiver and re-enters a sleep state.

Although the foregoing discussion only included two base stations 102, 104 in the set of base stations that coordinate simultaneous transmission of the first and second CWUSs, communication system 100 may include any suitable number of base stations that can all coordinate with each other to simultaneously transmit the first and second CWUSs. Moreover, although only first and second CWUSs were discussed above, any suitable number of CWUSs, each of which is specific to one particular base station or group of base stations, may be used.

In other examples, a first set of base stations (e.g., the serving base station 102 and the neighboring base station 104) may be assigned to a first Common Synchronization Channel (CSCH) area that utilizes a first CWUS, and a second set of base stations (not shown) may be assigned to a second CSCH area that utilizes a second CWUS, which is different than the first CWUS. For example, the first CWUS may utilize a first common set of time/frequency resources, and the second CWUS may utilize a second common set of time/frequency resources that are different than the first common set of time/frequency resources.

FIG. 3A is a messaging diagram of an example of the messages exchanged between the various system components shown in FIG. 1A. In this example, base station 102 transmits a common wake-up signal (CWUS) information signal to UE device 106, via signal 302. Similarly, base station 104 transmits a CWUS information signal to UE device 107, via signal 303. The CWUS information is information required by UE devices 106, 107 to receive the CWUS that will be simultaneously transmitted from both base stations 102, 104. The CWUS information may include time/frequency resource location information for the CWUS.

Base station 102 and base station 104 simultaneously transmit the CWUS to UE device 106. In the example of FIG. 3A, base station 102 and base station 104 also simultaneously transmit the CWUS to UE device 107. The signals that represent base station 102 and base station 104 simultaneously transmitting the CWUS to UE devices 106 and 107 are represented by signals 304 in FIG. 3A. Although the transmission of the CWUS from base station 104 may appear as occurring after the transmission of the CWUS from base station 102 in FIG. 3A, the transmissions of the CWUS are intended to occur simultaneously from both base stations 102, 104. As described above, the UE devices 106, 107 each combine the received CWUSs to improve CWUS detection performance.

In some examples, the UE device 106 utilizes the combined CWUSs to trigger the UE device 106 to monitor a Paging Occasion. If the UE device 106 receives a page message from the serving base station 102 during the Paging Occasion and the UE device 106 verifies that the page message contains the UE-ID associated with UE device 106, then the UE device 106 stays ON to receive subsequent control and data signals. The signal containing the page message transmitted from the serving base station 102 to the UE device 106 is represented by signal 306 in FIG. 3A.

Similarly, the UE device 107 utilizes the combined CWUSs to trigger the UE device 107 to monitor a Paging Occasion. If the UE device 107 receives a page message from the base station 104 during the Paging Occasion and the UE device 107 verifies that the page message contains the UE-ID associated with UE device 107, then the UE device 107 stays ON to receive subsequent control and data signals. The signal containing the page message transmitted from base station 104 to the UE device 107 is represented by signal 308 in FIG. 3A.

FIG. 3B is a messaging diagram of an example of the messages exchanged between the various system components shown in FIG. 1B. In this example, base station 102 transmits a first CWUS information signal to UE device 106, via signal 310. The first CWUS information is information required by UE device 106 to receive the first CWUS that is simultaneously transmitted from both base stations 102, 104 during a first subframe. The first CWUS information may include time/frequency resource location information for the first CWUS.

Similarly, base station 104 transmits a second CWUS information signal to UE device 107, via signal 312. The second CWUS information is information required by UE device 107 to receive the second CWUS that is simultaneously transmitted from both base stations 102, 104 during a second subframe. The second CWUS information may include time/frequency resource location information for the second CWUS.

Base station 102 and base station 104 simultaneously transmit the first CWUS to UE device 106 during a first subframe. The signals that represent base station 102 and base station 104 simultaneously transmitting the first CWUS to UE device 106 are represented by signals 314 in FIG. 3B. Although the transmission of the first CWUS from base station 104 may appear as occurring after the transmission of the first CWUS from base station 102 in FIG. 3B, the transmissions of the first CWUS are intended to occur simultaneously from both base stations 102, 104.

Base station 102 and base station 104 simultaneously transmit the second CWUS to UE device 107 during a second subframe. The signals that represent base station 102 and base station 104 simultaneously transmitting the second CWUS to UE device 107 are represented by signals 316 in FIG. 3B. Although the transmission of the second CWUS from base station 102 may appear as occurring after the transmission of the second CWUS from base station 104 in FIG. 3B, the transmissions of the second CWUS are intended to occur simultaneously from both base stations 102, 104.

As described above, UE device 106 combines the received first CWUSs to improve CWUS detection performance of the first CWUS. In some examples, the UE device 106 utilizes the combined first CWUSs to trigger the UE device 106 to monitor a Paging Occasion. If the UE device 106 receives a page message (not shown in FIG. 3B) from the serving base station 102 during the Paging Occasion and the UE device 106 verifies that the page message contains the UE-ID associated with UE device 106, then the UE device 106 stays ON to receive subsequent control and data signals.

Similarly, the UE device 107 combines the received second CWUSs to improve CWUS detection performance of the second CWUS. In some examples, the UE device 107 utilizes the combined second CWUSs to trigger the UE device 107 to monitor a Paging Occasion. If the UE device 107 receives a page message (not shown in FIG. 3B) from the base station 104 during the Paging Occasion and the UE device 107 verifies that the page message contains the UE-ID associated with UE device 107, then the UE device 107 stays ON to receive subsequent control and data signals.

Figure 4:
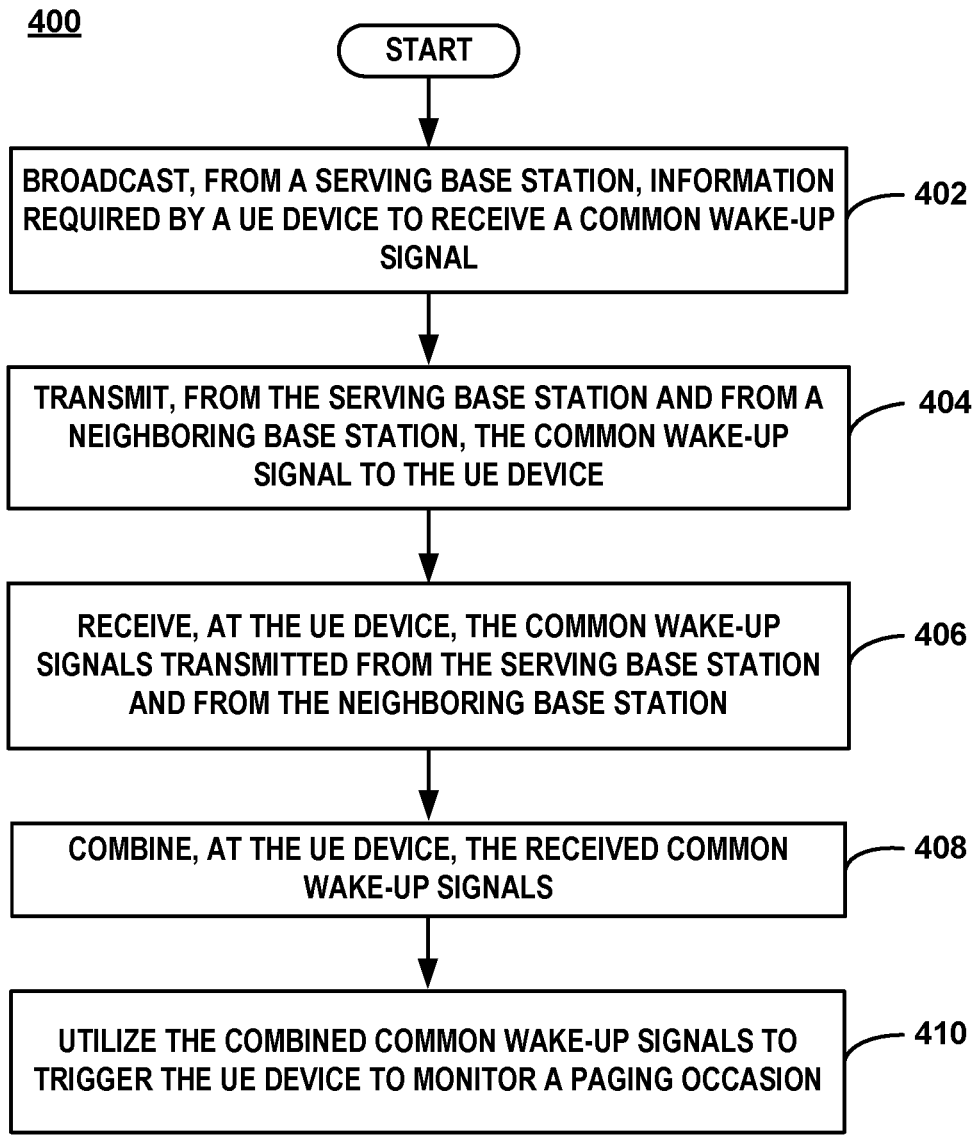
FIG. 4 is a flowchart of an example of a method in which a serving base station and a neighboring base station both transmit a CWUS utilizing a common set of time/frequency resources.

FIG. 4 is a flowchart of an example of a method in which a serving base station and a neighboring base station both transmit a CWUS utilizing a common set of time/frequency resources. The method 400 begins at step 402 with broadcasting, from serving base station 102, information required by UE device 106 to receive a common wake-up signal (CWUS). At step 404, serving base station 102 and neighboring base station 104 both transmit a CWUS to the UE device 106. At step 406, the UE device 106 receives the CWUSs transmitted from the serving base station 102 and the neighboring base station 104. At step 408, the UE device 106 combines the received CWUSs. At step 410, the UE device 106 utilizes the combined CWUSs to trigger the UE device 106 to monitor a Paging Occasion within a Paging Time Window.

FIG. 5 is a flowchart of an example of a method in which a serving base station and a neighboring base station both transmit a first common wake-up signal (CWUS) during a first subframe, utilizing a first common set of time/frequency resources. The serving base station and the neighboring base station both transmit a second CWUS during a second subframe, utilizing a second common set of time/frequency resources.

The method 500 begins at step 502 with base station 102 and base station 104 both transmitting, during a first subframe, a first CWUS to first UE device 106. The transmission of the first CWUS from base station 102 and the transmission of the first CWUS from base station 104 both utilize a first common set of time/frequency resources. The first CWUS also comprises an identifier associated with base station 102. At step 504, base station 104 and base station 102 both transmit, during a second subframe, a second CWUS to second UE device 107. The transmission of the second CWUS from base station 104 and the transmission of the second CWUS from base station 102 both utilize a second common set of time/frequency resources. The second CWUS also comprises an identifier associated with base station 104.

At step 506, the first UE device 106 receives the first CWUSs transmitted from base station 102 and base station 104, and the second UE device 107 receives the second CWUSs transmitted from base station 104 and base station 102. At step 508, the first UE device 106 combines the received first CWUSs, and the second UE device 107 combines the received second CWUSs. At step 510, the first UE device 106 utilizes the combined first CWUSs to trigger the UE device 106 to monitor a Paging Occasion within a Paging Time Window, and the second UE device 107 utilizes the combined second CWUSs to trigger the UE device 107 to monitor a Paging Occasion within a Paging Time Window.

Clearly, other embodiments and modifications of this invention will occur readily to those of ordinary skill in the art in view of these teachings. The above description is illustrative and not restrictive. This invention is to be limited only by the following claims, which include all such embodiments and modifications when viewed in conjunction with the above specification and accompanying drawings. The scope of the invention should, therefore, be determined not with reference to the above description, but instead should be determined with reference to the appended claims along with their full scope of equivalents.

The invention claimed is:

1. A method comprising:
    transmitting a first common wake-up signal (CWUS) from a serving base station to a user equipment (UE) device being served by the serving base station; and transmitting the first CWUS from a neighboring base station to the UE device;
    wherein, during a first subframe, the first CWUS comprises a first identifier that is associated with the serving base station, and wherein transmission of the first CWUS from the serving base station and transmission of the first CWUS from the neighboring base station both utilize a first common set of time/frequency resources during the first subframe, and
    wherein, during a second subframe, a second CWUS comprises a second identifier that is associated with the neighboring base station, and wherein transmission of the second CWUS from the serving base station and transmission of the second CWUS from the neighboring base station both utilize a second common set of time/frequency resources during the second subframe.

2. The method of claim 1, wherein the first CWUS transmission from the serving base station and the first CWUS transmission from the neighboring base station utilize an extended cyclic prefix.

3. The method of claim 1, further comprising:
    broadcasting, by the serving base station, information required by the UE device to receive the first CWUS and the second CWUS.

4. The method of claim 3, wherein the information comprises time/frequency resource location information.

5. The method of claim 3, wherein the information comprises an indication of whether the serving base station will be transmitting the first CWUS.

6. The method of claim 3, wherein the information comprises an indication of how many times the first CWUS will be repeated in a CWUS occasion.

7. The method of claim 1, further comprising:
    receiving, by the UE device, the first CWUS transmitted from the serving base station;
    receiving, by the UE device, the first CWUS transmitted from the neighboring base station;
    combining, by the UE device, the first CWUS received from the serving base station and the first CWUS received from the neighboring base station.

8. The method of claim 7, further comprising:
    utilizing the combined CWUSs to trigger the UE device to monitor a Paging Occasion.

9. The method of claim 1, further comprising:
    boosting a transmit power of at least one of the following: the first CWUS transmission from the serving base station and the first CWUS transmission from the neighboring base station.

10. The method of claim 1, further comprising:
    assigning the serving base station and the neighboring base station to a first Common Synchronization Channel (CSCH) area that utilizes the first CWUS that is different than the second CWUS utilized by a second CSCH area.

11. A system comprising:
    a serving base station comprising a transmitter configured to transmit, during a first subframe, using a first common set of time/frequency resources, a first common wake-up signal (CWUS) comprising a first identifier associated with the serving base station and transmit, during a second subframe, using a second common set of time/frequency resources, a second CWUS comprising a second identifier;
    a neighboring base station comprising a transmitter configured to transmit, during the first subframe, using the first common set of time/frequency resources, the first CWUS comprising the first identifier and transmit, during the second subframe, using the second common set of time/frequency resources, the second CWUS, the second identifier associated with the neighboring base station; and
    a user equipment (UE) device comprising a receiver configured to receive the first CWUS from the serving base station and the first CWUS from the neighboring base station.

12. The system of claim 11, wherein the transmission of the first CWUS from the serving base station and the transmission of the first CWUS from the neighboring base station utilize an extended cyclic prefix.

13. The system of claim 11, wherein the transmitter of the serving base station is further configured to broadcast information required by the UE device to receive the first CWUS.

14. The system of claim 13, wherein the information comprises time/frequency resource location information.

15. The system of claim 13, wherein the information comprises an indication of whether the serving base station will be transmitting the first CWUS.

16. The system of claim 13, wherein the information comprises an indication of how many times the first CWUS will be repeated in a CWUS occasion.

17. The system of claim 11, wherein the UE device further comprises a controller configured to combine the first CWUS received from the serving base station and the first CWUS received from the neighboring base station.

18. The system of claim 17, wherein the controller of the UE device is further configured to utilize the combined CWUSs to trigger the UE device to monitor a Paging Occasion.

19. The system of claim 11, wherein the transmitters of the serving base station and the neighboring base station are configured to boost a transmit power of the first CWUS transmissions.

20. The system of claim 11, further comprising:
    a first Common Synchronization Channel (CSCH) area in which the serving base station and the neighboring base station transmit the first CWUS that is different than the second CWUS transmitted in a second CSCH area.

* * * * *